US010951829B2

(12) United States Patent
Naito

(10) Patent No.: US 10,951,829 B2
(45) Date of Patent: Mar. 16, 2021

(54) IMAGE CAPTURING APPARATUS AND METHOD FOR CONTROLLING DISPLAY

(71) Applicant: CANON KABUSHIKI KAISHA, Tokyo (JP)

(72) Inventor: Go Naito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/700,925

(22) Filed: Dec. 2, 2019

(65) Prior Publication Data

US 2020/0186717 A1    Jun. 11, 2020

(30) Foreign Application Priority Data

Dec. 7, 2018  (JP) .............................. JP2018-229966

(51) Int. Cl.
*H04N 5/232*  (2006.01)

(52) U.S. Cl.
CPC ... *H04N 5/232945* (2018.08); *H04N 5/23277* (2013.01); *H04N 5/232939* (2018.08); *H04N 5/232941* (2018.08); *H04N 5/23258* (2013.01); *H04N 5/23287* (2013.01); *H04N 5/232127* (2018.08)

(58) Field of Classification Search
CPC .......... H04N 5/23222; H04N 5/23248–23287; H04N 5/23293; H04N 5/232935–232945
See application file for complete search history.

(56) References Cited

U.S. PATENT DOCUMENTS

2011/0234826 A1*  9/2011  Nguyen ................. G03B 17/20
                                                 348/208.6

FOREIGN PATENT DOCUMENTS

JP          2011-082719 A       4/2011

* cited by examiner

*Primary Examiner* — Paul M Berardesca
(74) *Attorney, Agent, or Firm* — Canon U.S.A., Inc. IP Division

(57) ABSTRACT

An image capturing apparatus includes an image sensor, a shake detector, at least one processor and a memory storing a program including instructions, which when executed by the at least one processor, cause the at least one processor to function as: a selection unit configured to select any area in an image capturing area, a generation unit configured to generate shake information during exposure of a still image on the image sensor in accordance with a detection result of the shake detector during the exposure of the still image, a photographing condition, and the area selected by the selection unit, and a control unit configured to cause the shake information to be displayed on a display unit during the exposure of the still image on the image sensor.

14 Claims, 5 Drawing Sheets

IMAGE CAPTURING APPARATUS AND METHOD FOR CONTROLLING DISPLAY

BACKGROUND

Field of the Disclosure

The present disclosure relates to display control of an image capturing apparatus that corrects camera shake during photographing.

Description of the Related Art

Many image capturing apparatuses and image capturing lenses are increasingly equipped with a shake correction mechanism with the recent increase in the performance of the image capturing apparatuses. The shake correction mechanism can decrease the influence of camera shake on an image captured by the user with an image capturing apparatus in the user's hand. Known examples of the shake correction mechanism included in the image capturing apparatus include a method of shake correction by driving some of the lenses of the image capturing optical system in a direction perpendicular to the optical axis and a method of shake correction by driving an image sensor in the camera main body in a direction perpendicular to the optical axis. Another known method is a method of shake correction by driving both of some of the lenses of the image capturing optical system and the image sensor.

Furthermore, it has recently increasingly become common to check the composition by looking at an image displayed on the display unit without using an optical viewfinder in photographing and to perform long exposure of still images by hand-held shooting owing to the improved performance of the shake correction mechanism. However, in the case where the user checks the composition by looking at an image displayed on the display unit without using an optical viewfinder, the user cannot check the state of the subject and the camera for a long time during long exposure because no image can be displayed during still-image exposure (during photographing).

To address the issue that the subject image cannot be viewed during photographing, Japanese Patent Laid-Open No. 2011-82719 discloses a technique for notifying the user of camera shake during exposure by displaying the motion of the camera on the viewfinder.

However, in the case where the motion of the camera is displayed on the viewfinder with respect to a reference position, as in the technique of Japanese Patent Laid-Open No. 2011-82719, how much the motion of the camera (that is, camera shake) influences the captured image cannot be determined. For example, for the same camera shake, the user cannot find out how much the captured image is affected when photographing conditions differ, such as when the focal lengths differ or when the image height of the main subject is large.

SUMMARY

An image capturing apparatus according to embodiments of the present disclosure includes an image sensor, a shake detector, at least one processor and a memory storing a program including instructions, which when executed by the at least one processor, cause the at least one processor to function as: a selection unit configured to select any area in an image capturing area, a generation unit configured to generate shake information during exposure of a still image on the image sensor in accordance with a detection result of the shake detector during the exposure of the still image, a photographing condition, and the area selected by the selection unit, and a control unit configured to cause the shake information to be displayed on a display unit during the exposure of the still image on the image sensor.

Further features of the present disclosure will become apparent from the following description of exemplary embodiments with reference to the attached drawings.

DESCRIPTION OF THE EMBODIMENTS

First Embodiment

Figure 1A:
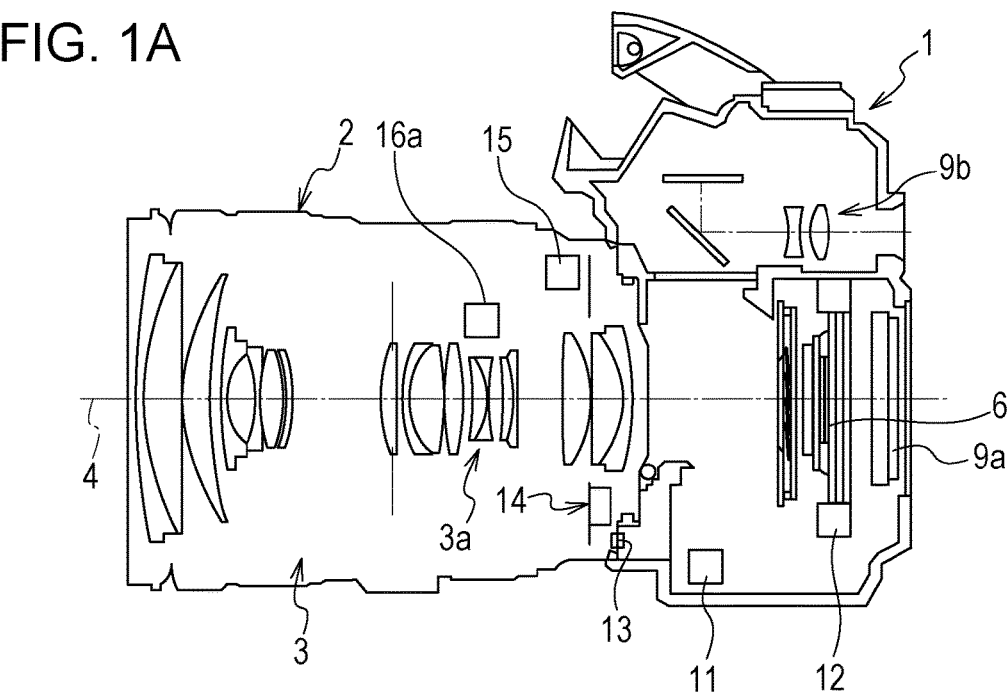
FIG. 1A is a central cross-sectional view of an image capturing apparatus according to a first embodiment of the present disclosure.

Referring to FIG. 1A to FIG. 3, a first embodiment of the present disclosure will be described hereinbelow. FIGS. 1A and 1B illustrate an image capturing apparatus according to the present embodiment. FIG. 1A is a central cross-sectional view of the image capturing apparatus. FIG. 1B is a block diagram illustrating the electrical configuration of the image capturing apparatus. In FIGS. 1A and 1B, like parts are given like reference signs.

Figure 1B:
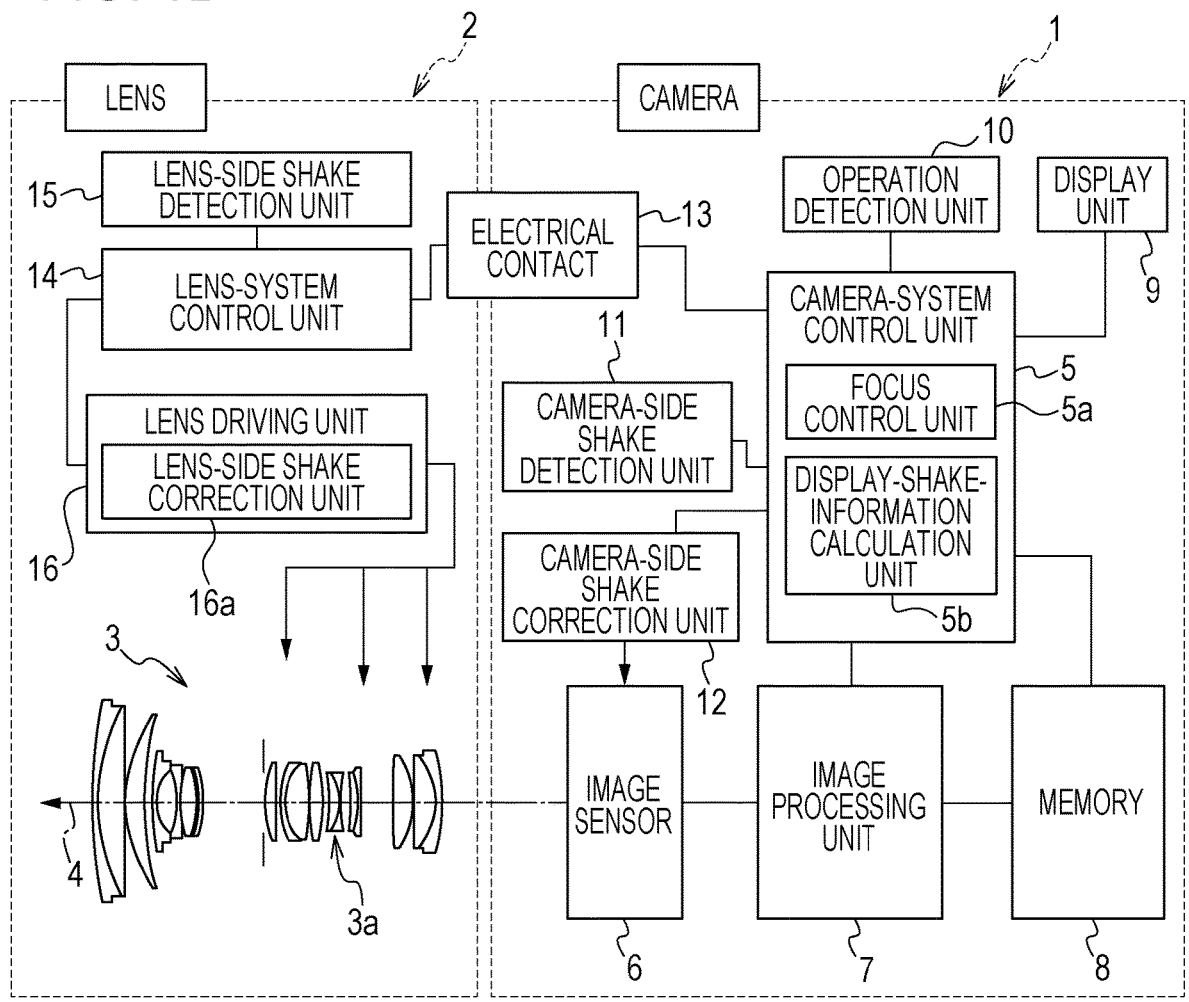
FIG. 1B is a block diagram illustrating the electrical configuration of the image capturing apparatus.

The image capturing apparatus illustrated in FIGS. 1A and 1B includes a camera main body 1 and a lens barrel 2 attached to the camera main body 1. Although the present embodiment illustrates a camera with interchangeable lenses in which the camera main body 1 and the lens barrel 2 are detachable from each other, the camera main body 1 and the lens barrel 2 may be integrated.

In FIGS. 1A and 1B, reference sign 3 denotes an image capturing optical system including a plurality of lenses disposed in the lens barrel 2, 4 denotes the optical axis of the image capturing optical system 3, 5 denotes a camera-system control unit, 6 denotes an image sensor, 7 denotes an image processing unit, and 8 denotes a memory. Reference sign 3a denotes a shake correction lens for correcting a shake in the image capturing optical system 3, 5a denotes a focus control unit in the camera-system control unit 5, and 5b denotes a display-shake-information calculation unit in the camera-system control unit 5. Reference sign 9 denotes a display unit on which live-view images and captured images are displayed, 9a denotes a back display unit, such as a liquid crystal display, disposed on the back of the camera main body 1, and 9b denotes an in-finder display unit disposed in the viewfinder of the camera main body 1. The back display unit 9a may be a touch panel serving both as a display unit and an operating unit. Reference sign 10 denotes an operation detection unit for detecting signals from an operating unit including a shutter release button (not illustrated). Reference sign 11 denotes a camera-side shake detection unit disposed in the camera main body 1, for detecting the motion of the camera main body 1 using an accelerometer or a gyroscope. Reference sign 12 denotes a camera-side shake correction unit disposed in the camera main body 1. The camera-side shake correction unit 12 includes a driving mechanism, such as a motor, for moving the image sensor 6 in a direction perpendicular to the image-capturing optical axis 4.

Reference sign 13 denotes an electrical contact for communication between the camera main body 1 and the lens barrel 2, and 14 denotes a lens-system control unit disposed in the lens barrel 2. Reference sign 15 denotes a lens-side shake detection unit disposed in the lens barrel 2, for detecting the motion of the lens barrel 2 using an accelerometer or a gyroscope, and 16 denotes a lens driving unit that drives a focus lens for adjusting the focus and the shake correction lens 3a for correcting a shake. Reference sign 16a denotes a lens-side shake correction unit including a driving mechanism, such as a motor, for moving the shake correction lens 3a in the direction perpendicular to the image-capturing optical axis 4.

The image processing unit 7 includes an analog-to-digital (A/D) converter, a white-balance control circuit, a gamma correction circuit, and an interpolation calculation circuit and generates recording images. A color-interpolation processing unit is disposed in the image processing unit 7 and performs color interpolation (demosaicing) on Bayer array signals to create a color image. The image processing unit 7 compresses images, moving images, voice, and so on using a predetermined method.

The memory 8 stores images output from the image processing unit 7 and outputs the stored images to the display unit 9 for display.

The camera-system control unit 5 controls the components of the camera main body 1 and communicates with the lens-system control unit 14 to control the components of the lens barrel 2. For example, when the operation detection unit 10 detects that a shutter release button (not illustrated) is pressed, the camera-system control unit 5 controls the driving of the image sensor 6, the operation of the image processing unit 7, a compressing operation, and so on. The camera-system control unit 5 also controls the state of each segment of the display unit 9 (display control) to display information on the display unit 9.

The camera-system control unit 5 is connected to the image processing unit 7 and obtains a suitable focal position and aperture position in accordance with the signal from the image sensor 6. The camera-system control unit 5 issues a command to the lens-system control unit 14 through the electrical contact 13, and the lens-system control unit 14 controls the focus lens and the aperture in the image capturing optical system 3. A method for determining the focal position and the aperture position is not limited to a particular method, and any other known method may be used, for example, a phase-difference detection method or a contrast method. In a shake correction mode, the camera-system control unit 5 controls the camera-side shake correction unit 12 on the basis of a signal from the camera-side shake detection unit 11 and controls the lens-side shake correction unit 16a on the basis of a signal from the lens-side shake detection unit 15.

A specific example of a method for shake correction will be described. First, the camera-system control unit 5 and the lens-system control unit 14 respectively obtain camera shake signals detected by the camera-side shake detection unit 11 and the lens-side shake detection unit 15. The camera-system control unit 5 and the lens-system control unit 14 respectively calculate the driving amounts of the image sensor 6 and the shake correction lens 3a on the basis of the acquisition results. Thereafter, the camera-system control unit 5 and the lens-system control unit 14 respectively send the calculated driving amounts to the camera-side shake correction unit 12 and the lens-side shake correction unit 16a as command values to drive the image sensor 6 and the shake correction lens 3a. A method for shake correction is not limited to this method. One of the camera-system control unit 5 and the lens-system control unit 14 may mainly calculate the driving amounts of the shake correction members (the shake correction lens 3 and the image sensor 6).

The camera-system control unit 5 and the lens-system control unit 14 respectively control the components of the camera main body 1 and the lens barrel 2 in accordance with user operations on the operating units (not illustrated) of the camera main body 1 and the lens barrel 2. This allows capturing still images and moving images.

Referring next to FIGS. 2A to 2E, shake-information display on the in-finder display unit 9b of the present embodiment will be described. In the following description, still image exposure for capturing a still image is simply referred to as "exposure", and "during still image exposure", "at still image exposure", and "before still image exposure" are hereinafter respectively referred to as "during exposure", "at exposure", and "before exposure". FIG. 2A to 2E illustrate subject images and shake information displayed on the in-finder display unit 9b before and at the exposure of the image sensor 6. The shake information illustrated in FIGS. 2A to 2E may be displayed not only on the in-finder display unit 9b but also on the back display unit 9a. The display area of the in-finder display unit 9b is larger than an image 21a, to be described later, and can display the whole of the image 21a and an image 21c, with the image 21a and the image 21c superposed.

In the present embodiment, an image during exposure supposed from the detection result of the camera-side shake detection unit 11 is superposed as shake information on a live view image immediately before the start of exposure of the image sensor 6. This allows notifying the user how much the camera has shaken from the start of exposure. The display on the in-finder display unit 9b will be described hereinbelow in chronological order. The image to be displayed during exposure may be a live view image immediately before the start of exposure. Alternatively, a live view image other than the last live view image in a predetermined time before the start of exposure may be displayed.

Although the following describes a method for calculating display shake information using the detection result of the camera-side shake detection unit 11, another shake detection unit may be used. For example, the lens-side shake detection unit 15 or both of the camera-side shake detection unit 11 and the lens-side shake detection unit 15 may be used.

Figure 2A:
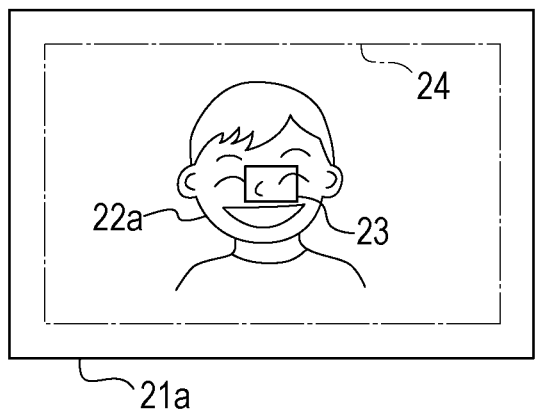
FIG. 2A to 2E are diagrams illustrating shake information displayed on a display unit according to the first embodiment of the present disclosure.

FIG. 2A illustrates a state in which a so-called live view image is displayed on the in-finder display unit 9b before exposure of the image sensor 6. The live view image is an image that the user views when determining the angle of view while looking in the in-finder display unit 9b, in which an image captured by the image sensor 6 is displayed substantially in real time during non-photographing time (during live view). In FIG. 2A, reference sign 21a denotes an image displayed as a live view image, 22a denotes a subject, 23 denotes an autofocus (AF) frame, and 24 denotes the drive range end of a shake correction mechanism, to be described later. The AF frame 23 is a frame with which the user selects a focal position in the screen. In a what-is-called autofocus mode, the driving amount of the focus lens for the subject in the AF frame is determined, and the focus lens is automatically driven. For this purpose, the user will look closely around the AF frame 23 in the in-finder display unit 9b. In other words, the point of regard of the user is the AF frame 23.

Figure 2B:
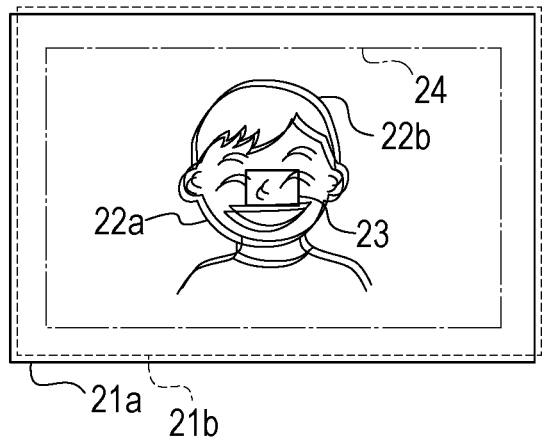

FIG. 2B illustrates the state of the in-finder display unit 9b when the shutter release button (not illustrated) or the like is fully pressed by the user, so that exposure of the image sensor 6 is started. When the camera-side shake detection unit 15 detects the camera shake of the user, the display-shake-information calculation unit 5b processes the live view image 21a before the exposure according to the output to superpose the shake information on the live view image before exposure and displays the image. Reference sign 21b denotes the image created by the display-shake-information calculation unit 5b according to the output of the camera-side shake detection unit 15, and 22b denotes the subject in the image 21b.

Specifically, the display-shake-information calculation unit 5b creates a supposed live view image during exposure in accordance with the shake information, such as the angular velocity and the acceleration of the camera main body 1, obtained by the camera-side shake detection unit 15, photographing conditions, and the live view image 21a immediately before the start of exposure. The photographing conditions here include a focal length determined by the image capturing optical system 3, a subject distance determined by the size of the subject and the distance to the subject, and image magnifying power. The amount of the shake on the image sensor 6 changes according to the photographing conditions. In other words, since the display shake information varies, the display-shake-information calculation unit 5b calculates shake information on the basis of the photographing conditions. In particular, calculation of the amount of a shake in the shift direction in which the camera main body 1 moves toward the subject in the direction perpendicular to the optical axis needs the photographing conditions described above. For this reason, the display-shake-information calculation unit 5b calculates display shake information on the basis of the above photographing conditions.

In FIG. 2B, the superposed image is displayed on the upper right of the image before exposure in FIG. 2A because the user has moved the camera main body 1 to the upper right of the subject. This indicates that a shake around the axis perpendicular to the image-capturing optical axis 4, that is, pitch and yaw shakes, and a shift shake in the direction perpendicular to the image-capturing optical axis 4 with respect to the camera main body 1 are input. The movement of the subject or the live view image parallel to the screen of the in-finder display unit 9b is hereinafter referred to as "movement in the pitch direction", "movement in the yaw direction", and "movement in the shift direction". Thus, creating an image during exposure (shake information) supposed from the present detection result of the shake detection unit and superposing the image on the displayed live view image before exposure allows the user to find out the degree of camera shake. The user can hold the camera with conscious of the camera shake by viewing the shake information as in FIG. 2B, obtaining an image with little blur.

Figure 2C:
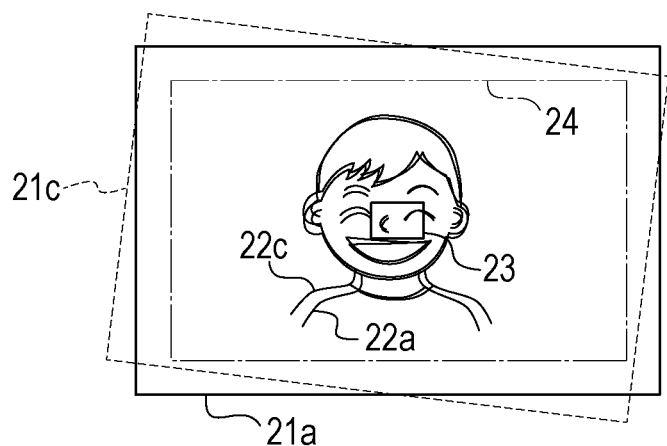

FIG. 2C illustrates an image containing a shake component in the direction of rotation about an axis parallel to the optical axis (a so-called roll direction), unlike FIG. 2B. The movement in the direction of rotation of the subject or the image with respect to the screen of the in-finder display unit 9b is hereinafter referred to as "movement in the roll direction". Reference sign 21c denotes an image created by the display-shake-information calculation unit 5b according to the output of the camera-side shake detection unit 15, and reference sign 22c denotes the subject in the image 21c. FIG. 2C illustrates an image during exposure, which is supposed to be an image created when the camera main body 1 rotates about an axis parallel to the optical axis, with the point of regard of the user in the in-finder display unit 9b, that is, the AF frame 23, as the center of rotation.

Figure 2D:
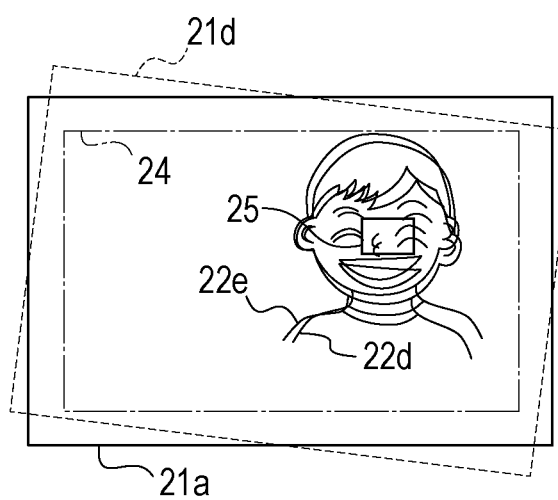
Figure 2E:
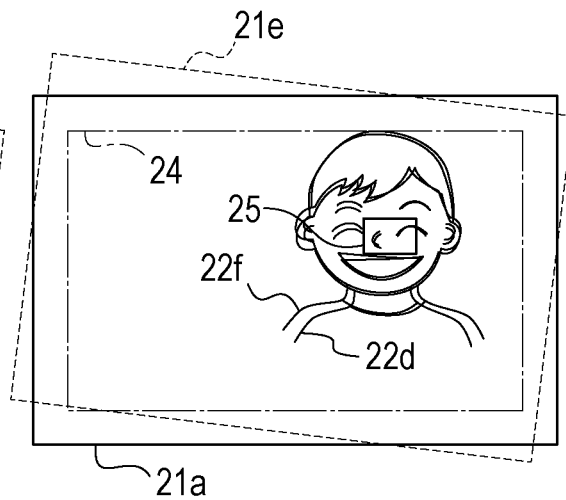

The advantages of the display with the AF frame 23 as the center of rotation, as described above, will be described with reference to FIGS. 2D and 2E. FIGS. 2D and 2E illustrate display images containing a shake component in the direction of rotation about an axis parallel to the optical axis, as in FIG. 2C, in which an AF frame 25 is set not at the center of the screen but at a higher position of the image, unlike FIG. 2C. FIG. 2D illustrates an image obtained by rotating the live view image 21a before exposure about the center of image, and FIG. 2E illustrates an image obtained by rotating the live view image about the AF frame 25.

In the images of FIGS. 2D and 2E, the AF frame 25, that is, the image heights of subjects 22d, 22e, and 22f, is higher than the image heights of the images in FIGS. 2A to 2C. For this reason, the image in FIG. 2D, in which a roll shake is detected, is displaced larger than the image in FIG. 2E. This may cause the user who looks at the image as in FIG. 2D to feel that not only the roll shake but also pitch and yaw shakes have occurred and to reposition the camera main body 1, further causing image blur. In contrast, rotating the live view image about the AF frame 25, in which the user may look, for display, as in FIG. 2E, allows the user to easily recognize the roll motion of the camera main body 1. This may prevent the adverse effect that the intention to suppress the camera shake conversely increases the camera shake.

Next, the driving range end 24 of the shake correction mechanism will be described. Since the shake correction units 16a and 12 respectively correct the shake by mechanically driving the shake correction lens 3a and the image sensor 6, the driving range is limited. Since the driving range (area) varies depending on the lens barrel 2 and the camera main body 1, the shape of the driving area varies. FIGS. 2A to 2E illustrate a rectangular diving range. In FIGS. 2A to 2E, reference sign 24 denotes a range in which the shake correction mechanism can move immediately before the start of exposure, whose position is fixed at the start of exposure and does not change until the end of the exposure. Thus, the position of the driving range end 24 determined in FIG. 2A immediately before the start of exposure does not change even in the states in FIGS. 2B to 2E. The driving range end 24 indicates how much shake can be corrected by the shake correction mechanism. If the end of the image calculated by the display-shake-information calculation unit 5b is within the driving range end 24 of the correction mechanism, the shake correction mechanism cannot sufficiently correct the shake. In FIGS. 2B and 2C, the end of the images calculated by the display-shake-information calculation unit 5b are outside the driving range end 24 of the correction mechanism, which indicates that the shake can be corrected by the shake correction mechanism.

Thus, by viewing the display shake information and the driving range end 24 of the shake correction mechanism at the same time, the user can determine the degree of the correctable shake.

If the driving range of the shake correction mechanism is exceeded, that is, the shake cannot be sufficiently corrected by the shake correction function, a warning about whether the shake can be corrected may be given by display or voice, in addition to the display of the driving range.

The display-shake-information calculation unit 5b may not display shake information on motions outside a predetermined frequency band, that is, a shake frequency band. For example, the display-shake-information calculation unit 5b may display shake information on motions of about 0.1 Hz to 10 Hz and may not display shake information on motions having the other frequency bands by removing the shake information by filtering or the like. This allows stabilizing the image displayed on the in-finder display unit 9b, making it easy for the user to see the image. Specific examples include a method of using a low-pass filter that allows signals of 10 Hz or less to pass through and a method of using a band-pass filter that allows signals of 0.1 Hz to 10 Hz to pass through.

The display shake information may be displayed exaggerated from the actual shake. For example, the display-shake-information calculation unit 5b may multiply the actual shake amount by a predetermined percentage to create an exaggerated display shake information for display. This makes the image displayed on the in-finder display unit 9b blurred more than the actual image, allowing the user to cope with the shake, such as repositioning the camera to reduce the camera shake, to provide an image with little camera shake.

Thus, calculating display shake information from the output of the shake detection units, the position of the AF frame 23, and the photographing conditions and displaying the result on the display unit allows the user to be notified of the influence of the present shake even during exposure. This also allows the user to see how much the shake correction unit has corrected the shake and at what degree the shake correction unit will become unable to correct the shake during exposure.

Figure 3:
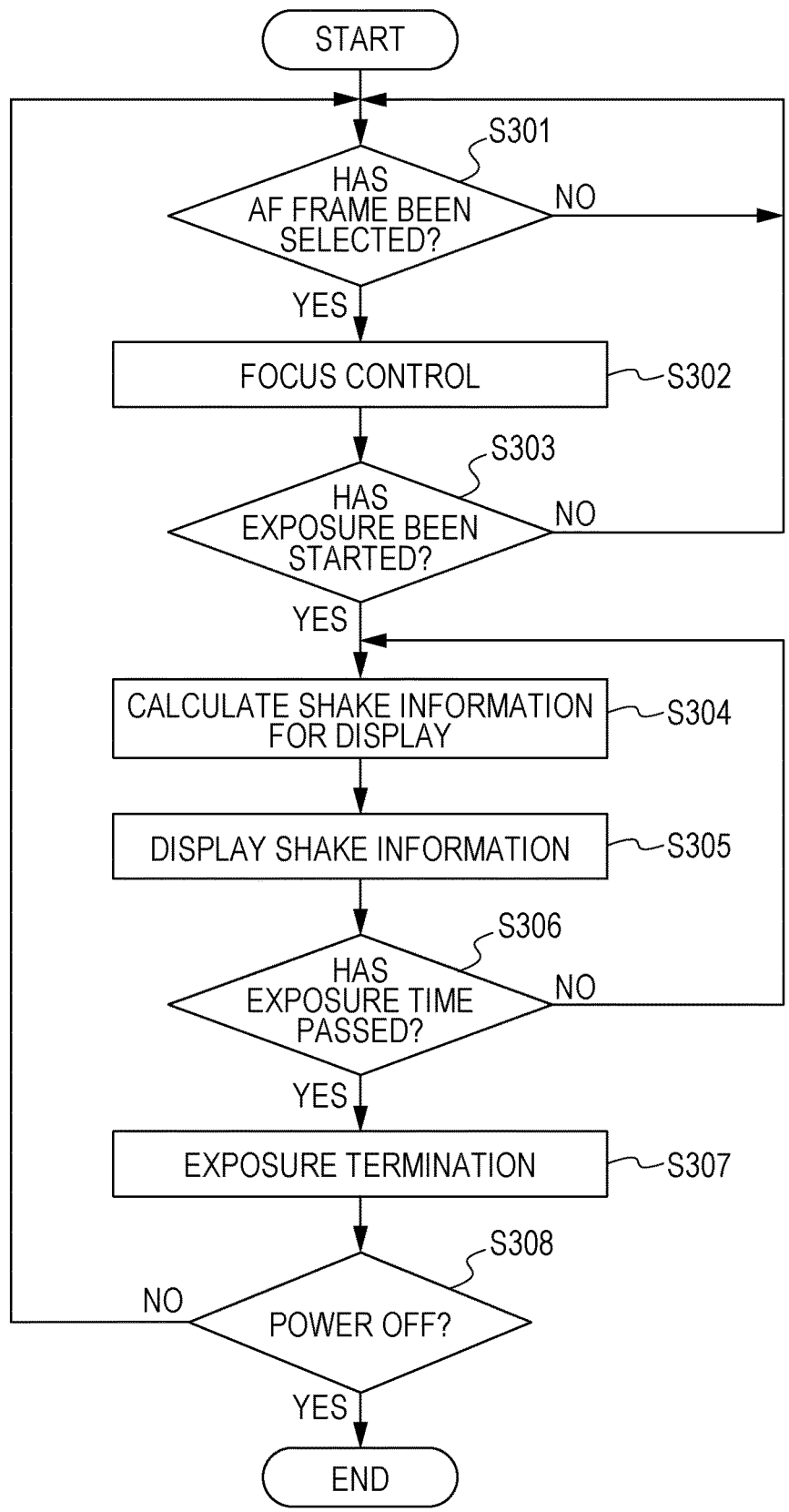
FIG. 3 is a flowchart for an operation for photographing according to the first embodiment of the present disclosure.

Next, an operation for photographing in the present embodiment will be described with reference to FIG. 3. FIG. 3 is a flowchart for the operation for photographing, which is started when the power source of the camera main body 1 is turned on. The flowchart of FIG. 3 illustrates only part of the operation for photographing to describe an operation related to the display of shake information. Known operation for photographing may be combined as appropriate.

When the power source of the camera main body 1 is turned on, the camera-system control unit 5 causes the back display unit 9a or the in-finder display unit 9b to display a live view image in step S301. The camera-system control unit 5 determines whether the user has selected an AF frame using an operating unit (not illustrated). If the user has selected an AF frame, the process goes to step S302. Otherwise, step S301 is repeated until an AF frame is selected.

If in step S302 an instruction for autofocusing is given, for example, by half-depression of a shutter release button (not illustrated), then the camera-system control unit 5 performs focus control using the focus control unit 5a. The camera-system control unit 5 communicates with the lens-system control unit 14 via the electrical contact 13 to cause the lens driving unit 16 to drive a focus lens (not illustrated), and the process goes to step S303. During this time, the live view image continues to be displayed on the back display unit 9a or the in-finder display unit 9b.

In step S303, the camera-system control unit 5 determines whether the user has given an instruction to start exposure by, for example, full-depression of the shutter release button (not illustrated). If the user has given an instruction to start exposure, the process goes to step S304, and otherwise, returns to step S301.

In step S304, the camera-system control unit 5 controls a shutter (not illustrated) and the image sensor 6 to start exposure. The display-shake-information calculation unit 51b calculates display shake information from the shake information detected by the camera-side shake detection unit 11, photographing conditions determined by the image capturing optical system 3 and so on, and the live view image 21a immediately before the start of exposure, and the process goes to step S305.

In step S305, the camera-system control unit 5 causes the back display unit 9a or the in-finder display unit 9b to display the display shake information superposed on the live view image 21a immediately before exposure serving as the base of the display shake information and goes to step S306.

In step S306, the camera-system control unit 5 determines whether a set exposure time has passed. If the exposure time has passed, the process goes to step S307; otherwise returns to step S304. The camera-system control unit 5 repeats calculation of display shake information and update of image display at predetermined intervals until the exposure time passes.

In step S307, the camera-system control unit 5 terminates the exposure and causes the back display unit 9a or the in-finder display unit 9b to display a live view image again and goes to step S308.

In step S308, the camera-system control unit 5 determines whether the power source of the camera main body 1 has been turned off using an operating unit including a power button (not illustrated). If the power has been turned off, the process ends, and if not, the process returns to step S301.

Thus, the user is notified of the influence of the present camera shake even during long exposure. The user is also notified during exposure how much the shake correction unit has corrected the camera shake and at what degree the shake correction unit will become unable to correct the camera shake.

Second Embodiment

Figure 4A:
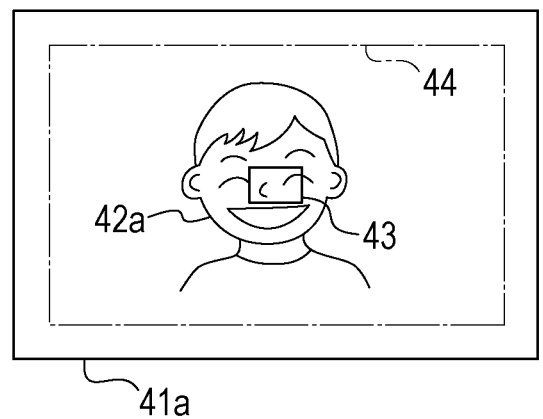
FIG. 4A to 4C are diagrams illustrating shake information displayed on a display unit according to a second embodiment of the present disclosure.
Figure 4B:
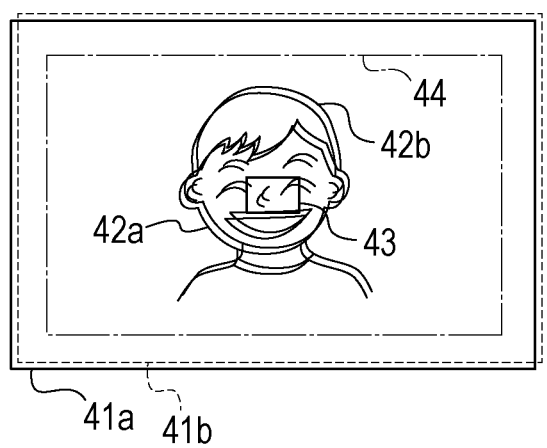
Figure 4C:
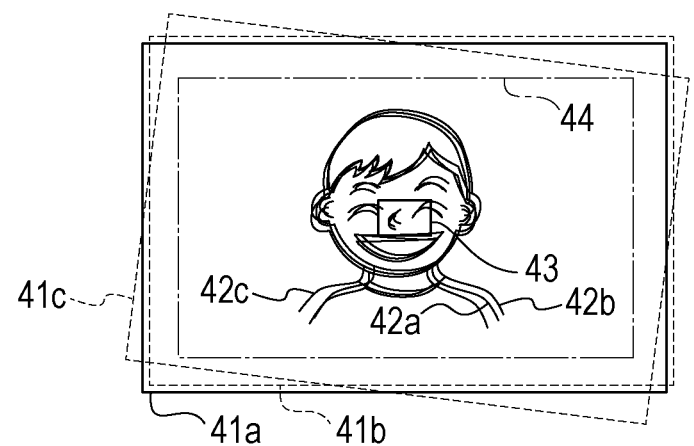

Referring to FIGS. 4A to 4C, a second embodiment of the present disclosure will be described hereinbelow.

The second embodiment differs from the first embodiment in the method for displaying shake information generated by the display-shake-information calculation unit 5b. Since the others are basically similar to those of the first embodiment, only the difference will be described in detail.

FIGS. 4A to 4C are diagrams illustrating shake information displayed on the in-finder display unit 9b in the present embodiment, illustrating subject images and shake information displayed on the in-finder display unit 9b before the start of exposure and during exposure of the image sensor 6, respectively. Also in the present embodiment, the shake information may be displayed on the back display unit 9a.

In the present embodiment, images created by the display-shake-information calculation unit 5b are displayed as shake information so as to be superposed on a live view image captured before the start of exposure one by one. This allows notifying the user how much the camera has shaken from the start of exposure in chronological order.

The display on the in-finder display unit 9b will be described hereinbelow in chronological order. The method for calculating shake information in the present embodiment is the same as the method of the first embodiment, and the display area of the in-finder display unit 9b is also the same as the display area of the first embodiment.

FIG. 4A illustrates a state in which a live view image is displayed on the in-finder display unit 9b before exposure of the image sensor 6, as in FIG. 2A. Reference sign 41a denotes an image displayed as a live view image, 42a denotes a subject, 43 denotes an AF frame, and 44 denotes the driving range end of the shake correction mechanism.

FIG. 4B illustrates the state of the in-finder display unit 9b when the shutter release button (not illustrated) or the like is fully pressed by the user, so that exposure of the image sensor 6 is started. When the camera-side shake detection unit 15 detects the camera shake of the user, the display-shake-information calculation unit 5b processes the live view image 41a before the exposure according to the output to superpose the shake information on the live view image before exposure and displays the image. Reference sign 41b denotes the image created by the display-shake-information calculation unit 5b according to the output of the camera-side shake detection unit 15, and 42b denotes the subject in the image 41b.

FIG. 4C illustrates an image in the case where a camera shake in the direction of rotation about an axis parallel to the optical axis (a so-called roll direction) is added to the state of FIG. 4B. Reference sign 41c denotes an image created by the display-shake-information calculation unit 5b according to the output of the camera-side shake detection unit 15, and reference sign 42c denotes the subject in the image 41c. FIG. 4C illustrates an image during exposure, which is supposed to be an image created when the camera main body 1 rotates about an axis parallel to the optical axis, with the point of regard of the user in the in-finder display unit 9b, that is, the AF frame 43, as the center of rotation. In FIG. 4C, the new image 41c is superposed on the state of FIG. 4B, in which supposed images during exposure are superposed one by one to notify the user of the history of the camera shake during exposure as shake information.

Thus, creating an image during exposure (shake information) supposed from the present detection result of the shake detection unit and superposing the image on the displayed live view image before exposure one by one allows the user to find out the degree of camera shake. The user can hold the camera with conscious of the shake by viewing the shake information as in FIG. 4C, obtaining an image with little blur.

Third Embodiment

Figure 5A:
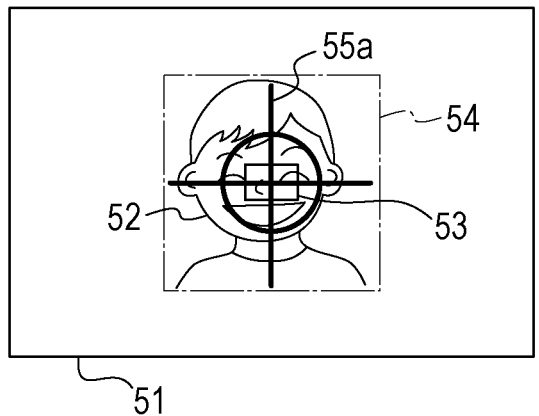
FIG. 5A to 5C are diagrams illustrating shake information displayed on a display unit according to a third embodiment of the present disclosure.
Figure 5B:
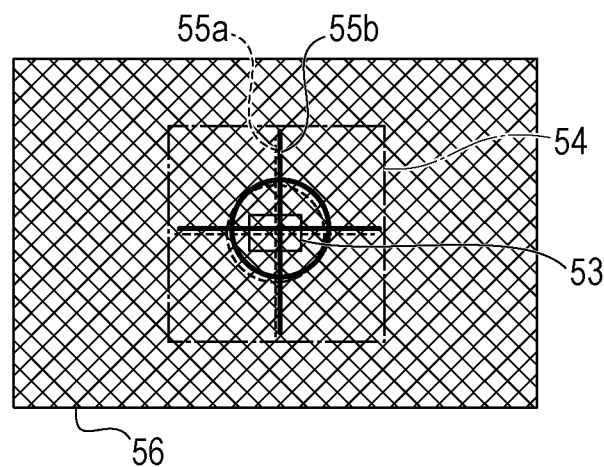
Figure 5C:
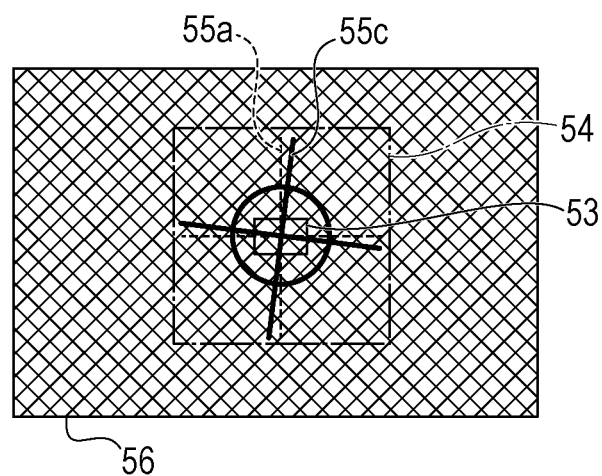

Referring to FIGS. 5A to 5C, a third embodiment of the present disclosure will be described hereinbelow.

The third embodiment differs from the first embodiment in the contents of shake information generated by the display-shake-information calculation unit 5b. Since the others are basically similar to those of the first embodiment, only the difference will be described in detail.

FIGS. 5A to 5C are diagrams illustrating shake information displayed on the in-finder display unit 9b in the present embodiment, illustrating subject images and shake information displayed on the in-finder display unit 9b before the start of exposure and during exposure of the image sensor 6, respectively. Also in the present embodiment, the shake information may be displayed on the back display unit 9a.

In the present embodiment, a shake-information display marker is displayed at the position of the AF frame in the live view image immediately before the start of exposure of the image sensor 6. An expected marker is calculated from the detection result of the camera-side shake detection unit 11 and is displayed as shake information so as to be superposed on the marker before the start of exposure. This allows notifying the user how much the camera has shaken from the start of exposure in chronological order. At that time, the shake-information display marker is displayed at the position of the AF frame which is the point of regard of the user.

The display on the in-finder display unit 9b will be described hereinbelow in chronological order. The method for calculating shake information in the present embodiment is the same as the method of the first embodiment.

FIG. 5A illustrates a state in which a live view image and the shake-information display marker, which is the point of regard of the user, at the position of the AF frame, are displayed on the in-finder display unit 9b before exposure of the image sensor 6. Reference sign 51 denotes an image displayed as the live view image, 52 denotes the subject, 53 denotes the AF frame, 54 denotes the driving range end of the shake correction mechanism, and 55a denotes the shake-information display marker.

When the camera main body 1 is moved before exposure to change the framing, the shake-information display marker 55a displayed on the in-finder display unit 9b does not move and is kept superposed on the AF frame 53.

FIG. 5B illustrates the state of the in-finder display unit 9b when a shutter release button (not illustrated) or the like is fully pressed, so that exposure of the image sensor 6 is started. Since the live view image disappears as exposure of the image sensor 6 starts, only the shake-information display marker is displayed. When the camera-side shake detection unit 15 detects the camera shake of the user, the display-shake-information calculation unit 5b calculates the position of the shake-information display marker in accordance with the output and displays the shake-information display marker superposed on the shake-information display marker 55a before exposure. Reference sign 56 denotes an area where no image is displayed, and 55b denotes the shake-information display marker during exposure. Referring to FIG. 5B, when exposure of the image sensor 6 is started, the shake-information display marker 55a before the exposure is indicated by broken lines and is used as the reference when the user checks shake information.

Specifically, the display-shake-information calculation unit 51b calculates a supposed shake-information display marker 55b from the shake information, such as the angular velocity and the acceleration of the camera main body 1, obtained by the camera-side shake detection unit 15, and photographing conditions. The calculated shake-information display marker 55b is displayed so as to be superposed on the shake-information display marker 55a immediately before the start of exposure.

FIG. 5B illustrates a state in which the user has moved the camera main body 1 to the upper right of the subject, so that the shake-information display marker 55b is displayed at the upper right of the shake-information display marker 55a. In other words, the shake-information display marker 55b during exposure is displayed at a position moved from the shake-information display marker 55a immediately before the start of exposure in accordance with the motion of the camera main body 1 during exposure.

This allows the user to hold the camera with conscious of the camera shake by viewing the shake information as in FIG. 5B, providing an image with little blur.

FIG. 5C illustrates the display on the in-finder display unit 9b including a shake component in the direction of rotation about an axis parallel to the optical axis (a roll direction), unlike FIG. 5B. Reference sign 55c denotes a shake-information display marker rotated about the axis parallel to the optical axis. The shake-information display marker 55c indicates the shake component in the direction of rotation about the axis parallel to the optical axis (the roll direction) using a tilt with the AF frame 53 as the center of rotation.

Thus, in the present embodiment, the shake-information display marker indicating the state of a camera shake during exposure is displayed during exposure so that the user can be accurately notified of camera shakes in the yaw, pitch, and shift directions during exposure and a camera shake in the roll direction.

In another method of display in the present embodiment, the length of the cross (hereinafter referred to as "arms") of the shake-information display marker may be varied according to the position (height) of the AF frame 53, The camera shake in the roll direction has greater influence with an increase in image height of the image sensor 6. For this reason, increasing the length of the AF frame 53, that is, the arms of the shake-information display marker, as the image height is larger makes it easier for the user to recognize the camera shake in the roll direction.

Thus, calculating display shake information from the output of the shake detection unit, the position of the AF frame, and the photographing conditions and displaying the result on the display unit allows the user to be notified of the influence of the present camera shake even during exposure. This also allows the user to see how much the shake correction unit has corrected the shake and at what degree the shake correction unit will become unable to correct the shake during exposure.

Although the above three embodiments illustrate examples in which the user selects the AF frame, the camera-system control unit 5 may select the AF frame on the basis of the live view image. In addition to selecting the AF frame, the user may select any area in the image capturing area according to the intention of photographing.

In displaying superposed shake information, the shake information may be displayed in a color different from the reference image or in a semitransparent state.

The above three embodiments illustrate examples in which shake information is displayed regardless of the exposure time. It is generally said that the influence of a camera shake on the captured image is small during an exposure time shorter than the reciprocal time of the focal length. If the exposure time is short, the time during which shake information is displayed is short, which makes it difficult for the user to ascertain the camera shake. For this reason, the shake information may be displayed during exposure only when the exposure time is longer than a predetermined time. The predetermined time may be fixed to a time in which the user can ascertain the camera shake, for example, one second, or may be varied according to the focal length.

In displaying a superposed image in which a camera shake during exposure is reflected to a live view image immediately before the start of exposure as in the first and second embodiments, displaying the entire image may make it difficult for the user to recognize the degree of the camera shake in some images. For this reason, only a predetermined area may be extracted from the selected AF frame of the image, or only a subject present in the selected AF frame may be extracted for display.

The user may be allowed to select which of the shake information display methods in the first to third embodiments.

The shake information may displayed not on the display unit 9 of the camera main body 1 but on a display unit of an external device (for example, a smartphone or a tablet terminal) connected to the camera main body 1. In this case, the shake information may be transmitted from a communication unit in the camera main body 1 to the external device by wire or wirelessly.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-229966, filed Dec. 7, 2018, which is hereby incorporated by reference herein in its entirety.

What is claimed is:
1. An image capturing apparatus comprising:
an image sensor;
a shake detector;
at least one processor and a memory storing a program including instructions, which when executed by the at least one processor, cause the at least one processor to function as:
a selection unit configured to select any area in an image capturing area;
a generation unit configured to generate shake information during exposure of a still image on the image sensor in accordance with a detection result of the shake detector during the exposure of the still image, a photographing condition, and the area selected by the selection unit; and
a control unit configured to cause the shake information to be displayed on a display unit during the exposure of the still image on the image sensor.

2. The image capturing apparatus according to claim 1, wherein the photographing condition includes at least one of a focal length and a subject distance of an image-capturing optical system.

3. The image capturing apparatus according to claim 1, wherein, when the detection result of the shake detector during exposure of the still image on the image sensor includes a shake component in a direction of rotation about an axis parallel to an optical axis of an image-capturing optical system, the generation unit generates the shake information in such a manner that the selected area is a rotation center of the shake component in the direction of rotation.

4. The image capturing apparatus according to claim 1, wherein the generation unit generates the shake information with limitation on a range of the detection result of the shake detector during the exposure of the still image on the image sensor.

5. The image capturing apparatus according to claim 1, wherein the control unit causes the shake information and a range in which a shake correction unit can correct a shake to be displayed on the display unit.

6. The image capturing apparatus according to claim 1, wherein, when a still image exposure time of the image sensor is shorter than a predetermined time, the control unit causes the shake information not to be displayed on the display unit.

7. The image capturing apparatus according to claim 1, wherein the control unit causes the shake information to be displayed on the display unit so as to be superposed on a live view image captured before the exposure of the still image of the image sensor.

8. The image capturing apparatus according to claim 7, wherein the generation unit generates an image, as the shake information, in which influence of a shake calculated from the detection result of the shake detector during the exposure of the still image on the image sensor, the photographing condition, and the selected area is reflected on the live view image captured before the exposure of the still image of the image sensor.

9. The image capturing apparatus according to claim 8, wherein the generation unit generates an image, as the shake information, in which influence of a shake calculated from the detection result of the shake detector during the exposure of the still image on the image sensor, the photographing condition, and the selected area is exaggeratedly reflected on the live view image captured before the exposure of the still image on the image sensor.

10. The image capturing apparatus according to claim 8, wherein the generation unit repeatedly creates an image in which the influence of the shake is reflected during the exposure of the still image on the image sensor.

11. The image capturing apparatus according to claim 10, wherein the control unit updates the shake information every time the shake information is newly generated by the generation unit and displays the shake information on the display unit.

12. The image capturing apparatus according to claim 10, wherein the control unit causes the shake information to be displayed on the display unit so as to be superposed every time the shake information is newly generated by the generation unit.

13. The image capturing apparatus according to claim 1, wherein the shake information comprises a marker having a predetermined shape.

14. A method for controlling display, the method comprising:
    detecting a shake;
    selecting any area in an image capturing area;
    generating shake information during exposure of a still image in accordance with a detection result of the shake detection step during the exposure of the still image on an image sensor, a photographing condition, and the area selected in the selection step; and
    controlling display to cause the shake information to be displayed on a display unit during the exposure of the still image on the image sensor.

* * * * *